(12) United States Patent
Toner et al.

(10) Patent No.: US 9,594,539 B1
(45) Date of Patent: Mar. 14, 2017

(54) USING APPLICATIONS OF ITEMS IN ITEM SEARCHES

(75) Inventors: Andrew R. Toner, Kirkland, WA (US); James C. Beck, Seattle, WA (US); Daniel Tam, Sunnyvale, CA (US); Anuradha Subraminian, Redwood City, CA (US); Benoit J. Dupin, Sunnyvale, CA (US); Christopher M. Hafner, Seattle, WA (US); Adam J. Sevillia, San Mateo, CA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 13/033,255

(22) Filed: Feb. 23, 2011

(51) Int. Cl.
*G06F 7/00* (2006.01)
*G06F 17/30* (2006.01)

(52) U.S. Cl.
CPC ............... *G06F 7/00* (2013.01); *G06F 17/30* (2013.01)

(58) Field of Classification Search
USPC ................................. 707/706–723, 759–769
See application file for complete search history.

(56) References Cited

U.S. PATENT DOCUMENTS

| | | | |
|---|---|---|---|
| 6,901,430 B1* | 5/2005 | Smith | 709/206 |
| 2001/0028742 A1* | 10/2001 | Gunji et al. | 382/229 |
| 2002/0091706 A1* | 7/2002 | Anderson et al. | 707/104.1 |
| 2004/0267818 A1* | 12/2004 | Hartenstine | G06Q 10/087 |
| 2006/0085741 A1* | 4/2006 | Weiner et al. | 715/517 |
| 2006/0184383 A1* | 8/2006 | Davis et al. | 705/1 |
| 2006/0190355 A1* | 8/2006 | Jammes et al. | 705/27 |
| 2007/0219982 A1* | 9/2007 | Piper | G06F 17/3043 |
| 2009/0019008 A1* | 1/2009 | Moore | G06Q 30/0269 |
| 2009/0138458 A1* | 5/2009 | Wanker | G06F 17/30864 |
| 2009/0278858 A1* | 11/2009 | Shigeeda | 345/629 |
| 2010/0153447 A1* | 6/2010 | Johnson et al. | 707/770 |

* cited by examiner

*Primary Examiner* — Tuan A Pham
(74) *Attorney, Agent, or Firm* — Thomas Horstemeyer, LLP (57) ABSTRACT

Disclosed are various embodiments for using applications of items in conducting item searches. It is determined, in one or more computing devices, whether a search query string includes an application key. A non-key portion of the search query string that excludes the application key is obtained when the search query string includes the application key. A search is executed on a subset of items in an item catalog using the non-key portion of the search query string to obtain a result set of items. Each item in the subset of items is associated with an item application that matches the application key.

25 Claims, 5 Drawing Sheets

USING APPLICATIONS OF ITEMS IN ITEM SEARCHES

BACKGROUND

Parts compatibility is very important for customers who are seeking to buy automotive parts. Some parts may be specific to only a few model years of an automobile. For example, an alternator purchased for one year of a truck make and model may not be compatible with the next year of the same truck make and model. By contrast, a part such as a light bulb may have thousands of potential applications for automobiles. Customers are typically asked to provide year, make, model, and/or other information through a set of closed-ended form inputs before conducting an online parts search.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to using applications of items in item searches. As used herein in the context of items, the term "application" refers to a specific usage or compatibility of one item with another item. For example, the item might be a part that is compatible with a particular system. An application key is used to identify the item with which other items are compatible. For example, the combination of a year, a make, a model, a trim style, and an engine configuration may identify a particular automobile. Various embodiments of the present disclosure allow a user to specify an application key within the search query string. The application key is used to select a subset of items based on the item applications that match the application key. The remainder of the search query string is employed for conducting a search in the subset of items. Although the present disclosure provides numerous examples relating to the automotive field, it is understood that the principles discussed herein may be applied to other fields where the scope of an item search is to be limited to a subset of items for compatibility and/or other reasons. In the following discussion, a general description of the system and its components is provided, followed by a discussion of the operation of the same.

Figure 1:
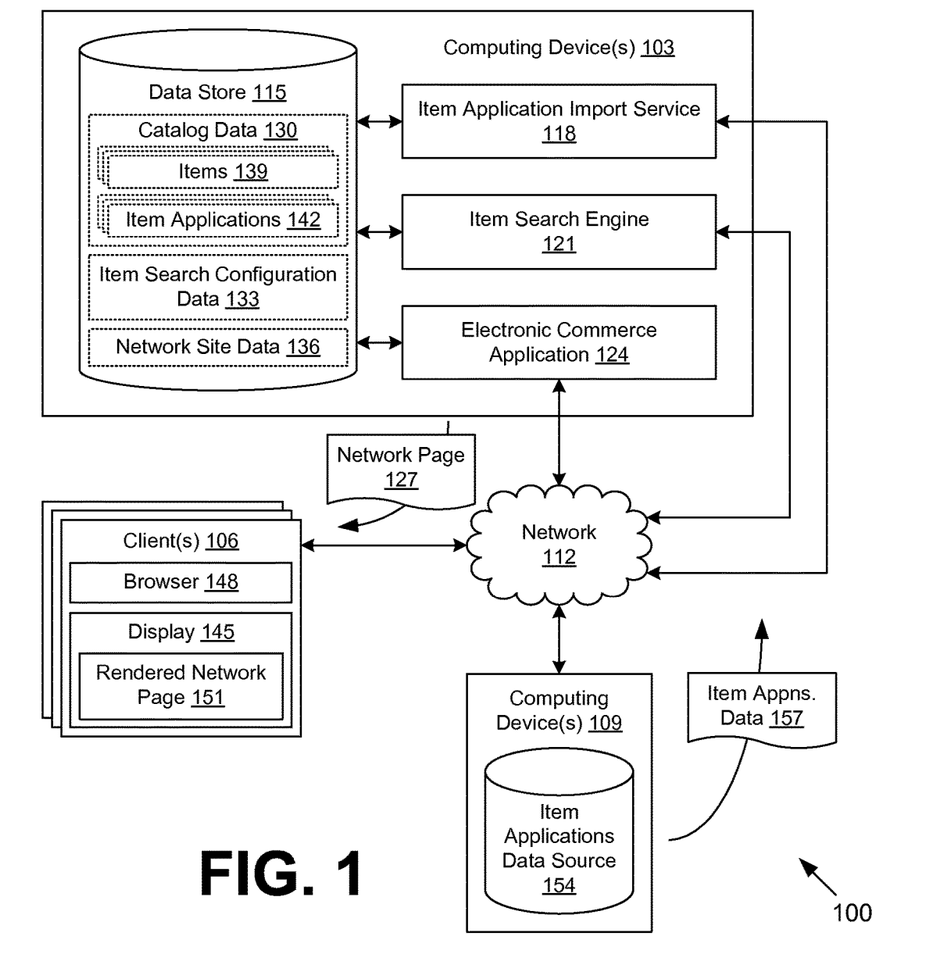
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 106 and one or more computing devices 109 by way of a network 112. The network 112 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 115 that is accessible to the computing device 103. The data store 115 may be representative of a plurality of data stores 115 as can be appreciated. The data stored in the data store 115, for example, is associated with the operation of the various applications and/or functional entities described below.

The components executed on the computing device 103, for example, include an item application import service 118, an item search engine 121, an electronic commerce application 124, and other applications, services, processes, systems, engines, or functionality not discussed in detail herein. The item application import service 118 is executed to obtain data regarding a multitude of applications of items from a source of compatibility information. In some embodiments, the source of compatibility information may correspond to a standardized source. The item application import service 118 is configured to associate the applications with the corresponding items in a catalog and/or index the items by their applications. As a non-limiting example, the item application import service 118 may obtain data from a standardized source describing the automobiles that are compatible with a particular model of brake pad. The item application import service 118 may then associate the corresponding brake pad item in the catalog with the applications obtained from the standardized source.

The item search engine 121 is executed to perform searches for items in a catalog that match a search query string. Where the search query string includes an application key, the scope of the search is reduced to a subset of items from the catalog that match the application indicated by the application key. In various embodiments, the remainder of the search query string, other than the application key, may be used in performing the search on the subset of items. As a non-limiting example, where the search query string relates to automotive items and specifies an automobile, the search may be limited to those items that are compatible with the specified automobile. The search may be executed within the compatible items based at least in part on the other keywords that make up the search query string. The item search engine 121 may be configured to generate one or more network pages 127, such as web pages or other types of network content, that describe items in a result set of items produced by the search.

The electronic commerce application 124 is executed in order to facilitate the online purchase of items over the network 112. The electronic commerce application 124 also performs various backend functions associated with the online presence of a merchant in order to facilitate the online purchase of items. For example, the electronic commerce application 124 generates network pages 127, such as web pages or other types of network content, that are provided to clients 106 for the purposes of selecting items for purchase, rental, download, lease, or other forms of consumption.

The data stored in the data store 115 includes, for example, catalog data 130, item search configuration data 133, network site data 136, and potentially other data. The catalog data 130 includes a plurality of items 139 offered by one or more merchants through an electronic marketplace. An item 139 may refer to a product, good, service, software download, multimedia download, social networking profile, or any combination, bundle, or package thereof, that may be offered for sale, purchase, rental, lease, download, and/or any other form of consumption as can be appreciated. The various data stored in catalog data 130 may include, for example, titles, descriptions, quantities, conditions, dimensions, images, options, weights, customer reviews, customer ratings, keywords, shipping restrictions, prices, core charges, tax classifications, unique identifiers, and any other data related to items 139. Each of the items 139 may be associated with one or more item categories as desired.

The catalog data 130 also includes a plurality of item applications 142, which indicate classifications of items 139 that may be used to select a subset of the items 139. For example, the item applications 142 may indicate compatibility of items 139 with other types of items. In one case, the item applications 142 indicate a list of automobiles that are compatible with automotive items 139. An item 139 may be associated with any number of item applications 142, potentially in the thousands. In one embodiment, the item applications 142 may be stored separately from the items 139 to avoid storing an excessive amount of data in one field. An item application 142 includes one or more data fields that are used to identify the item application 142 by way of an application key. Where the item application 142 corresponds to an automobile, the item application 142 may include, for example, a make, a model, a year, an engine type, a trim style, and/or other data needed to identify a type of automobile to ensure that an automotive item 139 is compatible.

The item search configuration data 133 includes various parameters used to configure the interpretation of search queries by the item search engine 121. For example, the item search configuration data 133 may specify that searches for certain types of items 139 (e.g., parts, electronics, chemicals, toys, etc.) be interpreted specially to reduce the search scope to items 139 that match an item application 142 provided in the search query string. The type of items 139 sought may be determined based in part on the keywords in the search query string, a specified category of items, a referring network page 127, and/or other data.

The item search configuration data 133 may also configure how the item search engine 121 is to parse and recognize application keys from the keywords in a search query string. As a non-limiting example, an application key for an item application 142 corresponding to an automobile may include a make, a model, and a year. To this end, the item search configuration data 133 may list valid makes (e.g., "Studebaker," "Pontiac," "Plymouth," "AMC," etc.), models (e.g., "Commander Starliner," "GTO," "Sundance," "Gremlin," etc.), and variations thereof. The item search configuration data 133 may also include synonyms, nicknames, and other keywords that may alternatively be used to indicate a make, model, etc. The item search configuration data 133 may also configure how years are to be interpreted.

In some embodiments, the item search configuration data 133 may include a master list of automobiles to ensure that invalid combinations (e.g., "1960 Honda Camry") are recognized and handled appropriately. It is noted that some keywords may be used in entirely different combinations. For example, "Eldorado" may correspond both to a specific make of automobile and to a trim style of a different make of automobile. The item search configuration data 133 is used to determine the minimum keywords needed for recognizing an item application 142.

The network site data 136 includes various data used in generating the network pages 127 for the network site(s) hosted by the electronic commerce application 124. Such data may include, for example, templates, code, text, images, graphics, audio, video, and so on. The network site data 136 may include other data that enables the electronic commerce application 124 to take and process orders for items 139.

The client 106 is representative of a plurality of client devices that may be coupled to the network 112. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display 145. The display 145 may comprise, for example, one or more devices such as cathode ray tubes (CRTs), liquid crystal display (LCD) screens, gas plasma-based flat panel displays, LCD projectors, or other types of display devices, etc.

The client 106 may be configured to execute various applications such as a browser 148 and/or other applications. The browser 148 may be executed in a client 106, for example, to access and render network pages 127, such as web pages, or other network content served up by the computing device 103 and/or other servers, thereby generating a rendered network page 151 on the display 145. The client 106 may be configured to execute applications beyond the browser 148 such as, for example, email applications, instant message applications, and/or other applications.

The computing device 109 may comprise, for example, a server computer or any other system providing computing capability. Alternatively, a plurality of computing devices 109 may be employed that are arranged, for example, in one or more server banks or computer banks or other arrangements. For example, a plurality of computing devices 109 together may comprise a cloud computing resource, a grid computing resource, and/or any other distributed computing arrangement. Such computing devices 109 may be located in a single installation or may be distributed among many different geographical locations. For purposes of convenience, the computing device 109 is referred herein in the singular. Even though the computing device 109 is referred to in the singular, it is understood that a plurality of computing devices 109 may be employed in the various arrangements as described above.

Various applications and/or other functionality may be executed in the computing device 109 according to various embodiments. Also, various data may be made available through an item applications data source 154 that is accessible to the computing device 109. This data may correspond to item applications data 157 used in generating and/or updating the item applications 142. In one embodiment, the item applications data source 154 may correspond to a standardized source of compatibility information. The item application import service 118 may request the item applications data 157 from the item applications data source 154. In some embodiments, the computing device 109 may be behind the same firewall as the computing device 103 and may be operated by the same organization. In other embodiments, the computing device 109 may be operated by a different organization from the computing device 103.

Next, a general description of the operation of the various components of the networked environment 100 is provided. To begin, at periodic intervals or in response to the addition of a new item 139 to the catalog data 130, the item application import service 118 may import item applications data 157 from an item applications data source 154. The item applications data 157 is used by the item application import service 118 to populate the item applications 142 in the catalog data 130.

A user at a client 106 visits a network site of a merchant hosted by the electronic commerce application 124. Although examples are given herein regarding a network site of a merchant, it is understood that the principles of the present disclosure may be applied to any item search engine 121. The user obtains a network page 127 generated by the electronic commerce application 124, which includes a form input field for entering a search query string. The user enters one or more keywords in the form input field and submits the form to item search engine 121 on the computing device 103. The one or more keywords correspond to a search query string and may specify an application key that may be used to identify items 139 that match item applications 139.

The search query string that includes an application key is in contrast to entering the application key through closed-ended form components, like drop-down boxes, radio buttons, etc. Moreover, specifying an application key may be optional. The item search engine 121 obtains the search query string from the client 106 and determines whether an application key is present. Such a check may depend on identifying the search query string as being related to a category of items 139 for which item applications 142 are relevant. If no application key is present, a search may be conducted on the entirety of the items 139 in the catalog data 130 or a subset of the items 139 as determined by factors beyond the search query string, such as an explicit selection of a category of items 139. In some embodiments, a user may be able to save one or more application keys in order to limit the scope of future searches.

If one or more application keys are present in the search query string, the item search engine 121 is configured to execute a search within the items 139 that pertain to, or are compatible with, the item application(s) 142 specified in the search query string. In some embodiments, a keyword search that excludes the portion of the search query string corresponding to the application key(s) is performed on data related to the subset of applicable items 139. Thus, an item 139 may be found that is compatible with the item application 142 specified by the application key, but the description of the item 139 might not include the application key. Such a result is highly desirable for items 139 that are associated with a multitude of item applications 142, as the descriptions of the items 139 are unlikely to include keywords pertaining to all of the valid item applications 142.

As a consequence of the search, a result set of items 139 is produced. The item search engine 121 then generates one or more network pages 127 that list and/or describe the items 139 in the result set. Such network pages 127 may include, for example, links to obtain more information about the items 139, place orders for the items 139, and/or perform other actions.

It is noted that the results of a search conducted from a search query string that specifies an application key is likely to produce more relevant results than a search that merely searches catalog data 130 for keywords. For example, a search that is solely keyword based for "1996 kia sephia windshield wiper blade" might turn up a windshield wiper blade compatible with a 1996 Honda Accord (matching "1996") and a 1997 Kia Sephia (matching "kia sephia"), but not the actual application of a 1996 Kia Sephia. With certain categories of items 139, such as automotive parts, compatibility is crucial. Allowing customers to order incompatible parts would inevitably lead to customer frustration. To this end, all of the keywords in an application key may be employed to limit the scope of the search, thereby excluding incompatible items 139 from the search results. In some embodiments, certain keywords, such as, for example, year, may be designated as required keywords in order to determine an application key.

Whether an application key produces a match against an item application 142 may be configured through the item search configuration data 133. For example, if a user searches for "1975 ford distributor cap," the item search engine 121 may be configured to map "1975 ford" to all of the item applications 142 for any Ford model from 1975. The ordering of the application key within the search query string may be insignificant in some embodiments. Also, the item search engine 121 may be configured to recognize an application key even when its constituent keywords are separated in the search query string. As a non-limiting example, the item search engine 121 may be configured to recognize an application key of "1975 ford pinto" from a search query string of "1975 fuel tank ford pinto," even though "fuel tank" separates "1975" and "ford pinto" in the search query string.

In various embodiments, the item search engine 121 may be configured to provide a behavior-based search experience. In a behavior-based search experience, keywords are obtained or inferred based on customer behavior data rather than being explicitly provided in a search query. As a non-limiting example, certain automobiles are more susceptible to problems than others. Suppose that the fuel tank of the 1975 Ford Pinto has a defect. The item search engine 121 may be configured to bring up a compatible item 139 that is a fuel tank upon a search for "1975 ford pinto," even though no non-application-related keywords are in the search query. In a behavior-based search experience, it may be observed, based on sales, searches, and other behavioral data, that users who search for "1975 ford pinto" often also search for, or click on, the item 139 corresponding to the fuel tank. Therefore, the item search application 121 may be automatically configured to surface fuel tank items 139 in the search results.

Further, it is understood that the principles of the present disclosure are applicable to other types of items 139 beyond automotive items 139. As non-limiting examples, customers may be searching for parts that would fit a certain electronic device, games that are playable within a certain game console, videos that are playable with a certain video playback technology, toys that are recommended for children of a specified age, lawn chemicals that are safe for a specified type of lawn grass, and so on.

In various embodiments, the item search engine 121 may be configured to store the search query strings that are used to find an item 139. To this end, the item search engine 121 may associate at least a portion of the search query string with one or more items 139 in the result set of items 139. Such associations may be made, for example, when a user clicks through to the item 139, when a user orders the item 139, when a user views the item 139, and/or in response to some other action after obtaining the search results. Such data may be useful in analyzing what terms users are searching for when they select an item 139.

Figure 2:
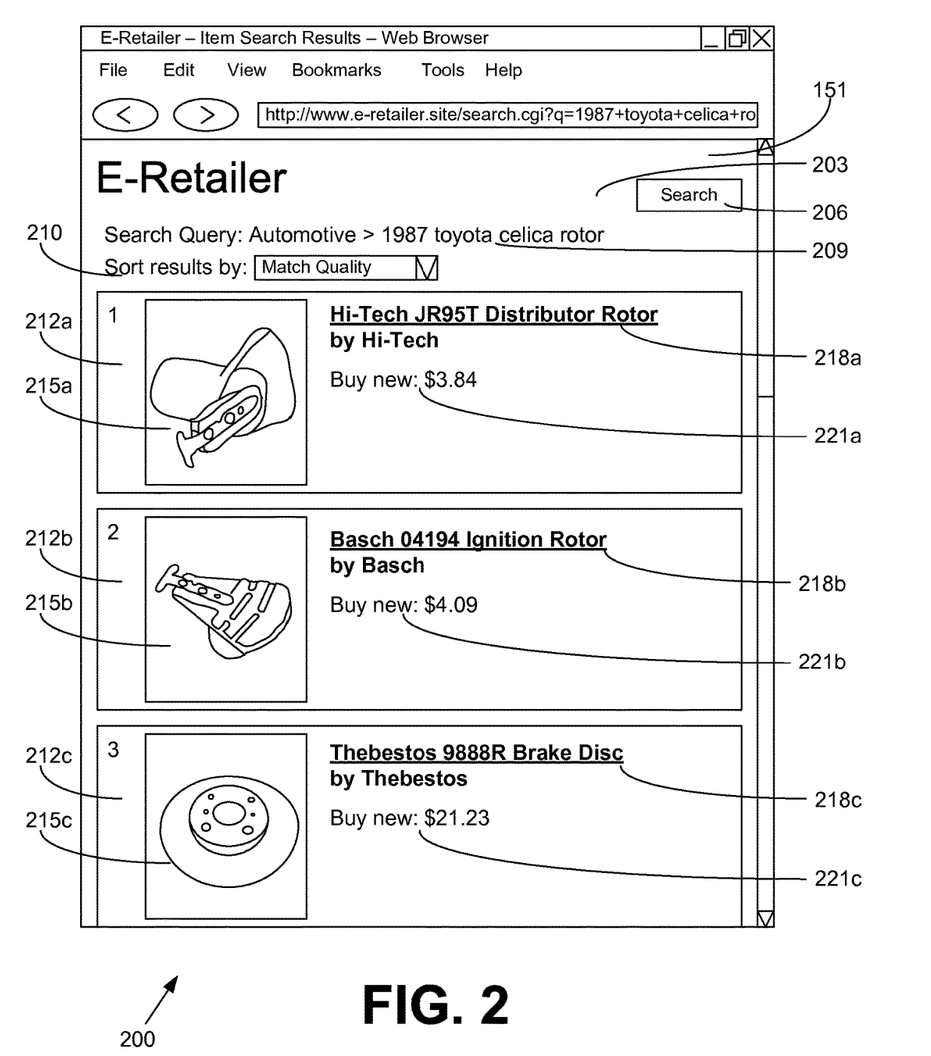
FIG. 2 is a drawing of an example of a user interface rendered by a client in the networked environment of FIG. 1 according to various embodiments of the present disclosure.

Turning now to FIG. 2, shown is one non-limiting example of a user interface 200 rendered by a browser 148 (FIG. 1) executed in a client 106 (FIG. 1) in the networked environment 100 (FIG. 1). In particular, the user interface 200 depicts a rendered network page 151 generated as a result of executing a search for items 139 (FIG. 1) through the item search engine 121 (FIG. 1). The rendered network page 151 includes a search query input component 203 and a search submission component 206 for submitting a search query string to the item search engine 121.

In this example, a search query string of "1987 toyota celica rotor" has been executed. From this search query string, "1987 toyota celica" is recognized as the application key portion and "rotor" is recognized as the non-key portion. The search query string is shown both in the search query input component 203 and in a search description 209. The search description 209 indicates that the field of search was limited to items 139 in the "Automotive" category. Such a limitation may result from the context of the search, the identity of a referring network page 127 (FIG. 1), an explicit selection of a category of items 139, and so on. The rendered network page 151 may include a sorting tool 210 to allow a user to sort the search results, for example, by match quality, lowest price, highest price, newest items 139, and so on. Although the sorting tool 210 is depicted as including a drop-down box, it is understood that the sorting tool 210 may include other user interface components in other embodiments, e.g., checkboxes, links, buttons, radio buttons, etc.

Three item descriptions 212a, 212b, and 212c corresponding to items 139 from the result set are shown in the rendered network page 151, but it is understood that additional item descriptions 212 corresponding to the result set of items 139 may be included within further rendered network pages 151 and/or outside the current viewport of the browser 148 as rendered on the display 145 (FIG. 1). Each item description 212 has a respective item image 215a, 215b, or 215c; a respective item title 218a, 218b, or 218c; and a respective item price 221a, 221b, or 221c. The item descriptions 212 may include, for example, a link to a detail network page 127 regarding the corresponding item 139, a link to add the corresponding item 139 to a list (e.g., a wishlist, gift registry, shopping cart, etc.), a link to order the corresponding item 139, and/or other user interface components.

The item descriptions 212 correspond to items 139 from the catalog data 130 (FIG. 1) that match the item application 142 identified by "1987 toyota celica" and include the keyword "rotor." It is noted that in this example, the item descriptions 212 do not appear to include the keywords of "1987," "Toyota," or "Celica." Although this is not a requirement, this example illustrates the flexibility of embodiments of the present disclosure to refine searches based in part on data not included in the description of the item 139. In addition, although the item titles 218a and 218b do include the keyword "rotor," the item title 218c does not. However, the item 139 described by the item description 212c is a brake disc, which may also be called a rotor. Therefore, the item search engine 121 may have determined that the item 139 matches the search query based on data fields associated with the item 139 other than title or data that maps other keywords to the item 139.

Figure 3:
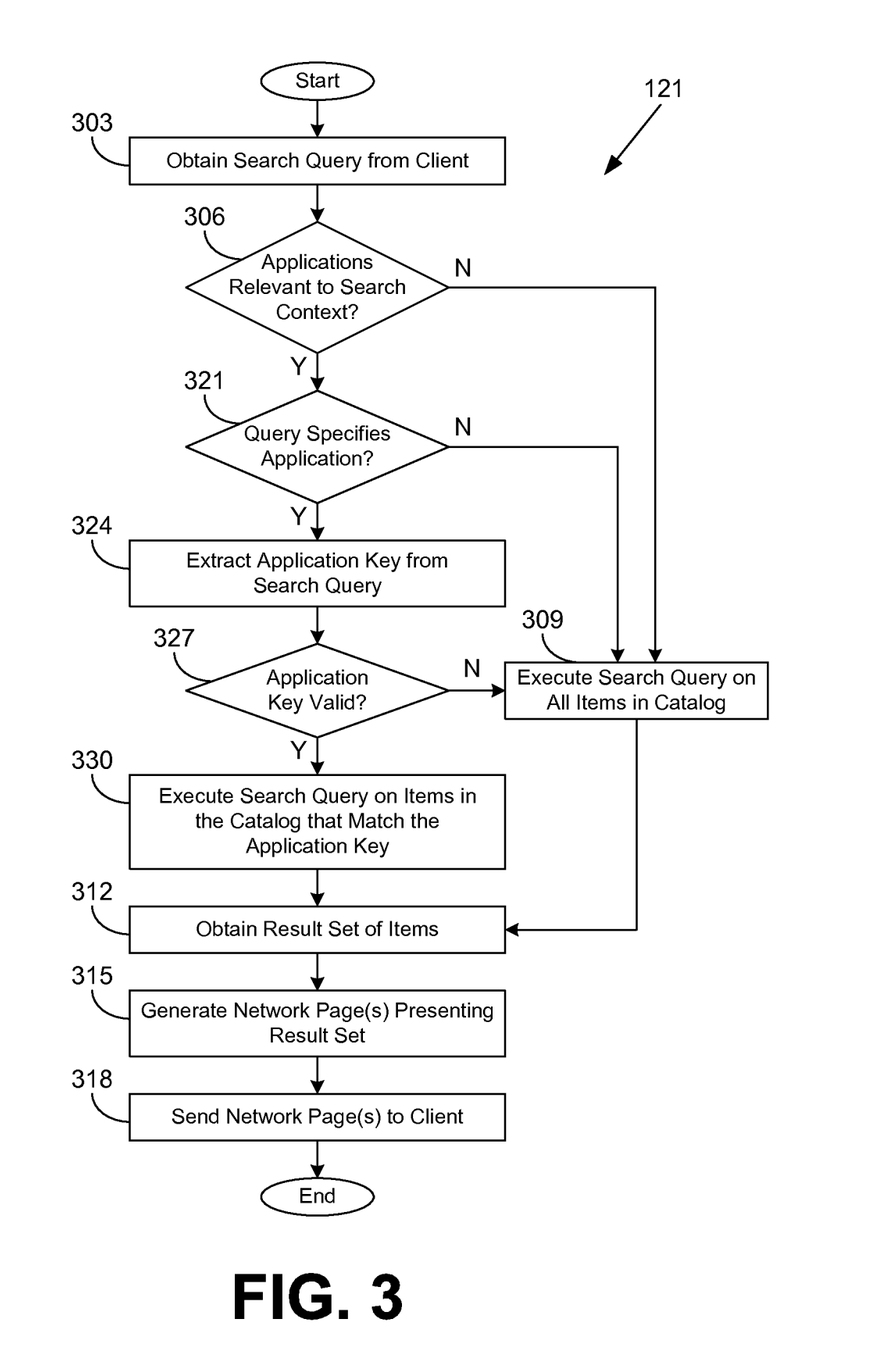
FIG. 3 is a flowchart illustrating one example of functionality implemented as portions of an item search engine executed in a computing device in the networked environment of FIG. 1 according to various embodiments of the present disclosure.

Referring next to FIG. 3, shown is a flowchart that provides one example of the operation of a portion of the item search engine 121 according to various embodiments. It is understood that the flowchart of FIG. 3 provides merely an example of the many different types of functional arrangements that may be employed to implement the operation of the portion of the item search engine 121 as described herein. As an alternative, the flowchart of FIG. 3 may be viewed as depicting an example of steps of a method implemented in the computing device 103 (FIG. 1) according to one or more embodiments.

Beginning with box 303, the item search engine 121 obtains a search query string from a client 106 (FIG. 1). In one embodiment, the search query string is a line of text entered by a user through an input form field of a network page 127 (FIG. 1). In box 306, the item search engine 121 determines whether item applications 142 (FIG. 1) are relevant to the current context of the search. As a non-limiting example, item applications 142 may be relevant for a search that is executed within an automotive department of an online store, but not relevant for a search that is executed within a gift card department. The determination of relevance may be made with reference to the item search configuration data 136 (FIG. 1).

If item applications 142 are not relevant to the search context, the item search engine 121 proceeds to box 309, where a search using the search query string is executed on all items 139 (FIG. 1) in the catalog. In box 312, the item search engine 121 obtains a result set of items 139 from the search. In box 315, the item search engine 121 generates one or more network pages 127 that present at least some of the items 139 in the result set of items 139. In box 318, the item search engine 121 sends the generated network page(s) 127 to the client 106. Thereafter, the portion of the item search engine 121 ends.

If the item search engine 121 instead determines in box 306 that item applications 142 are at least potentially relevant to the search context, the item search engine 121 proceeds to box 321. In box 321, the item search engine 121 determines whether the search query string specifies at least one item application 142. As a non-limiting example, the search query string may include a make, a model, and a year corresponding to an automobile item application 142. In some embodiments, a search query string may specify multiple item applications 142, for example, by specifying a make and model but not a year.

If the item search engine 121 determines in box 321 that the search query string does not specify an item application 142, the item search engine 121 proceeds to box 309, where a search using the search query string is executed on all items 139 in the catalog. In box 312, the item search engine 121 obtains a result set of items 139 from the search. In box 315, the item search engine 121 generates one or more network pages 127 that present at least some of the items 139 in the result set of items 139. In box 318, the item search engine 121 sends the generated network page(s) 127 to the client 106. Thereafter, the portion of the item search engine 121 ends.

If the item search engine 121 instead determines in box 321 that the search query string does specify an item application 142, the item search engine 121 moves to box 324 and extracts an application key from the search query string. The application key corresponds to one or more keywords that identify one or more item applications 142. It is noted that multiple application keys may map to the same item application 142 where synonyms or short forms are employed. As a non-limiting example, "88 chevy nova" may be equivalent to "1988 Chevrolet Nova," as the item search engine 121 may recognize "88" as a shortened form of "1988" and "chevy" as a synonym for "Chevrolet." Additionally, the item search application 121 may be able to deduce a full application key from fewer than all keywords. As a non-limiting example, "1984 omni" may be recognized as "1984 Dodge Omni" because the only model "Omni" for the "1984" year was made by "Dodge."

In box 327, the item search engine 121 determines whether the application key is valid. The item search engine 121 may perform this check with reference to the item search configuration data 133. As a non-limiting example, the application key "2008 Toyota Celica" may include keywords that are all individually valid (i.e., "2008," "Toyota," and "Celica") but do not together correspond to a valid application key because no Toyota Celicas were produced for the 2008 model year.

If the item search engine 121 determines that the application key is not valid, the item search engine 121 moves to box 309, where a search using the search query string is executed on all items 139 in the catalog. In box 312, the item search engine 121 obtains a result set of items 139 from the search. In box 315, the item search engine 121 generates one or more network pages 127 that present at least some of the items 139 in the result set of items 139. In box 318, the item search engine 121 sends the generated network page(s) 127 to the client 106. Thereafter, the portion of the item search engine 121 ends.

If the item search engine 121 instead determines that the application key is valid, the item search engine 121 continues to box 330. In box 330, the item search engine 121 executes a search using the search query string on items 139 in the catalog that match the application key. To this end, the item search engine 121 may identify a subset of items 139 from the catalog that are associated with item applications 142 that match the application key. In various embodiments, the search query that is executed on the subset of items 139 may correspond to the portion of the search query string that does not include the application key. As a non-limiting example, if a user enters a search query string of "1989 honda accord distributor cap," then "1989 honda accord" corresponds to the application key, and "distributor cap" corresponds to the non-key portion of the string that is employed for the search of the subset of items 139.

Next, in box 312, the item search engine 121 obtains a result set of items 139 from the search. It is noted that the data associated with the items 139 need not include the exact text from the non-key portion of the string. In one embodiment, synonyms and regional variations included in the data describing the items 139 may match the search keywords. As a non-limiting example, a search query for "tyres" may match "tires." In box 315, the item search engine 121 generates one or more network pages 127 that present at least some of the items 139 in the result set of items 139. In box 318, the item search engine 121 sends the generated network page(s) 127 to the client 106. Thereafter, the portion of the item search engine 121 ends.

Figure 4:
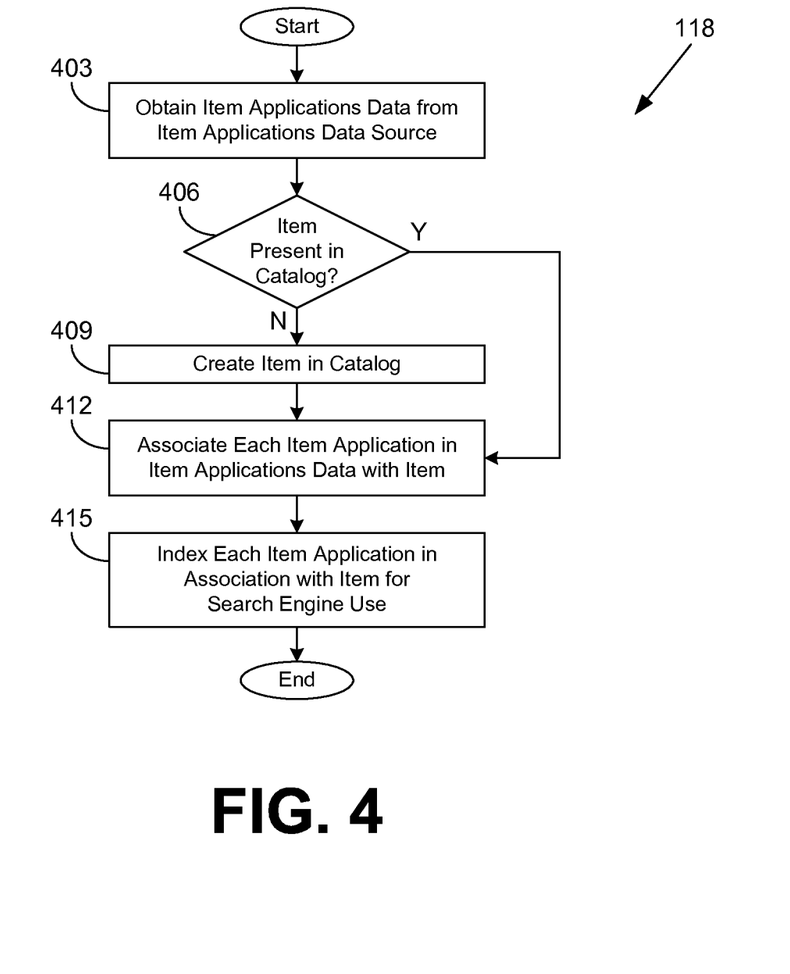
FIG. 4 is a flowchart illustrating one example of functionality implemented as portions of an item application import service executed in a computing device in the networked environment of FIG. 1 according to various embodiments of the present disclosure.

Continuing on to FIG. 4, shown is a flowchart that provides one example of the operation of a portion of the item application import service 118 according to various embodiments. It is understood that the flowchart of FIG. 4 provides merely an example of the many different types of functional arrangements that may be employed to implement the operation of the portion of the item application import service 118 as described herein. As an alternative, the flowchart of FIG. 4 may be viewed as depicting an example of steps of a method implemented in the computing device 103 (FIG. 1) according to one or more embodiments.

Beginning with box 403, the item application import service 118 obtains item application data 157 (FIG. 1) from the item applications data source 154 (FIG. 1) on the computing device 109 (FIG. 1) via the network 112 (FIG. 1). In one embodiment, the item applications data source corresponds to a standardized source of information regarding item applications 142 (FIG. 1). In various embodiments, the item application import service 118 may query the item applications data source 154 for item applications data 157 regarding specific items 139 (FIG. 1). Also, the item application import service 118 may periodically receive a data feed of the item applications data 157 from the item applications data source 154.

In box 406, the item application import service 118 determines whether an item 139 described in the item applications data 157 is present in the catalog data 130 (FIG. 1). For example, the item application import service 118 may be processing a data feed for a number of items 139, including some that are not currently present in the catalog data 130. If the item application import service 118 determines that the item 139 is not present in the catalog data 130, the item application import service 118 creates the item 139 in the catalog data 130 in box 409. The item application import service 118 then proceeds to box 412. If the item application import service 118 determines in box 406 that the item 139 is present in the catalog, the item application import service 118 also proceeds to box 412.

In box 412, the item application import service 118 associates each item application 142 described in the item applications data 157 with the item 139 in the catalog data 130 to which it pertains. As a non-limiting example, the item applications data 157 may describe a number of automobiles that are compatible with a particular automotive battery item 139. The item application import service 118 is configured to associate each of the automobiles with the automotive battery item 139 as item applications 142 in the data store 115 (FIG. 1). Next, in box 415, the item application import service 118 indexes each item application 142 in association with the item 139 for use by the item search engine 121 (FIG. 1). Consequently, the item search engine 121 is able to identify the items 139 that match a given item application 139. Thereafter, the portion of the item application import service 118 ends.

Figure 5:
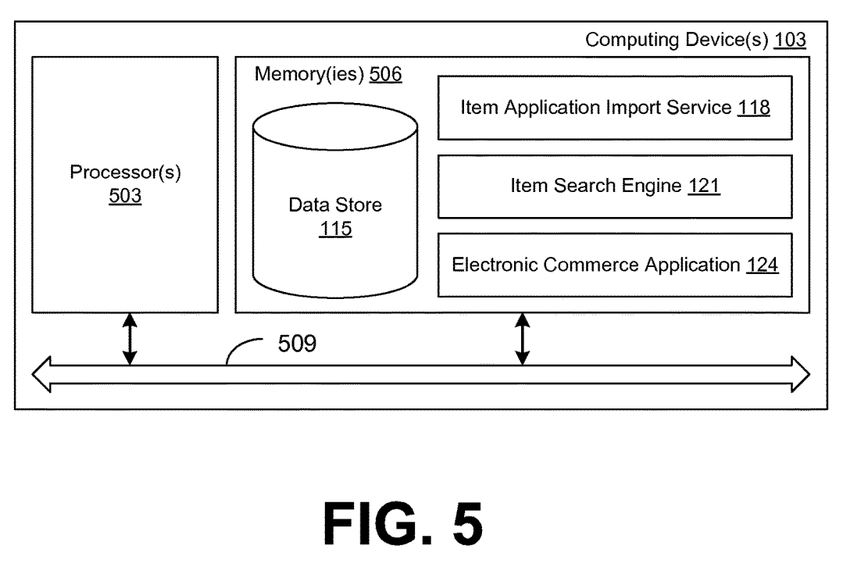
FIG. 5 is a schematic block diagram that provides one example illustration of a computing device employed in the networked environment of FIG. 1 according to various embodiments of the present disclosure.

With reference to FIG. 5, shown is a schematic block diagram of the computing device 103 according to an embodiment of the present disclosure. The computing device 103 includes at least one processor circuit, for example, having a processor 503 and a memory 506, both of which are coupled to a local interface 509. To this end, the computing device 103 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the item application import service 118, the item search engine 121, the electronic commerce application 124, and potentially other applications. Also stored in the memory 506 may be a data store 115 and other data. In addition, an operating system may be stored in the memory 506 and executable by the processor 503.

It is understood that there may be other applications that are stored in the memory 506 and are executable by the processors 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and the memory 506 may represent multiple memories 506 that operate in parallel processing circuits, respectively. In such a case, the local interface 509 may be an appropriate network 112 (FIG. 1) that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the item application import service 118, the item search engine 121, the electronic commerce application 124, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3 and 4 show the functionality and operation of an implementation of portions of the item search engine 121 and the item application import service 118, respectively. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the item application import service 118, the item search engine 121, and the electronic commerce application 124, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein when executed the program causes the at least one computing device to at least:
   obtain a search query string from a client;
   determine that the search query string includes a plurality of application keywords describing a make, a model, and a year of an automobile;
   identify a result set of automotive items from a catalog of items according to the application keywords, the result set of automotive items being compatible with the automobile;
   rank the result set of automotive items according to customer behavior data indicating selections of automotive items by a plurality of other users who also searched for automotive items compatible with the automobile, wherein ranking the result set of automotive items is configured to surface in the result set a particular automotive item that is associated with a defect in the automobile;
   determine an inferred keyword according to the automobile and additional customer behavior data that indicates a plurality of sales of automotive items to the plurality of other users;
   determine a non-application keyword specified in the search query string;
   identify a subset of the result set of automotive items according to the inferred keyword and the non-application keyword;
   generate at least one network page describing at least the subset of the result set of automotive items; and
   send the at least one network page to the client.

2. The non-transitory computer-readable medium of claim 1, wherein when executed the program causes the at least one computing device to at least:
   receive a selection of a particular automotive item of the result set of automotive items from the client; and
   store an identification of the particular automotive item in association with the search query string in a data store.

3. The non-transitory computer-readable medium of claim 1, wherein the non-application keyword pertains to a commonly defective item.

4. The non-transitory computer-readable medium of claim 1, wherein the inferred keyword pertains to a commonly defective item.

5. A system, comprising:
   at least one computing device comprising a processor and a memory; and
   an item search engine comprising machine readable instructions stored in the memory that, when executed by the processor, cause the at least one computing device to at least:
   determine that a search query string includes a plurality of application keywords describing a make, a model, and a year of an automobile;
   identify a result set of automotive items from a catalog of items according to the application keywords, the result set of automotive items being compatible with the automobile;
   rank the result set of automotive items according to customer behavior data indicating selections of automotive items by a plurality of other users who also searched for automotive items compatible with the automobile, wherein ranking the result set of automotive items is configured to surface in the result set a particular automotive item that is associated with a defect in the automobile;
   determine an inferred keyword according to the automobile and additional customer behavior data that indicates a plurality of sales of automotive items to the plurality of other users;
   determine a non-application keyword specified in the search query string; and
   identify a subset of the result set of automotive items according to the inferred keyword and the non-application keyword.

6. The system of claim 5, wherein the non-application keyword pertains to a commonly defective item.

7. The system of claim 5, wherein the individual ones of the result set of automotive items identify another item in the item catalog as being compatible.

8. The system of claim 5, further comprising an item application import service comprising additional machine readable instructions stored in the memory that, when executed by the processor, further cause the at least one computing device to at least:
   periodically obtain a data feed describing a plurality of item applications from a standardized source on another computing device via a network; and
   associate a corresponding item in the item catalog with the plurality of item applications.

9. The system of claim 5, further comprising an item application import service comprising additional machine readable instructions stored in the memory that, when executed by the processor, further cause the at least one computing device to at least:
   periodically obtain a data feed describing a plurality of item applications from a standardized source on another computing device via a network;
   determine that a corresponding item that pertains to the plurality of item applications does not exist in the catalog of items;
   create the corresponding item in the catalog of items; and
   associate the corresponding item in the catalog of items with the plurality of item applications.

10. The system of claim 9, wherein the item application import service further comprises additional machine readable instructions that cause the at least one computing device to at least index the plurality of the item applications according to a plurality of attributes associated with each one of the plurality of item applications.

11. The system of claim 5, wherein the item search engine further comprises machine readable instructions that cause the at least one computing device to at least:
obtain the search query string from a client; and
generate at least one network page listing at least one item in the result set of items.

12. The system of claim 5, wherein the inferred keyword pertains to a commonly defective item.

13. The system of claim 5, wherein the item search engine further comprises machine readable instructions that cause the at least one computing device to at least:
receive a selection of a particular automotive item of the result set of automotive items from the client; and
store an identification of the particular automotive item in association with the search query string in a data store.

14. The system of claim 5, wherein the item search engine further comprises machine readable instructions that cause the at least one computing device to at least send the network page to the client.

15. A method, comprising:
determining, by at least one computing device comprising a processor and a memory, that a search query string includes a first keyword describing an automobile;
identifying, by the at least one computing device, a result set of automotive items from a catalog of items according to the first keyword, the result set of automotive items being compatible with the automobile;
ranking, by the at least one computing device, the result set of automotive items according to a first set of customer behavior data indicating selections of automotive items by a plurality of customers who also searched for automotive items compatible with the automobile, wherein ranking the result set of automotive items is configured to surface in the result set a particular automotive item that is associated with a defect in the automobile;
inferring, by the at least one computing device, a second keyword according to the automobile and a second set of customer behavior data that indicates a plurality of sales of automotive items to the plurality of customers;
determining, by the at least one computing device, a non-application keyword specified in the search query string; and
identifying, by the at least one computing device, a subset of the result set of automotive items according to the inferred second keyword and the non-application keyword.

16. The method of claim 15, wherein the inferred second keyword pertains to a commonly defective item in the automobile.

17. The method of claim 15, wherein the customer behavior data further indicates a plurality of sales of items to the plurality of customers.

18. The method of claim 15, further comprising
extracting, by the at least one computing device, the first keyword from a search query string.

19. The method of claim 15, wherein the first keyword comprises one of a plurality of keywords that correspond to a make, a model, or a year of the automobile.

20. The method of claim 15, further comprising:
obtaining, by the at least one computing device, the search query string from a client;
generating, by the at least one computing device, at least one network page describing at least some of the result set of automotive items; and
sending, by the at least one computing device, the at least one network page to the client.

21. The method of claim 15, further comprising storing, by the at least one computing device, an association of at least a portion of the search query string with at least one of the items in the result set of automotive items.

22. The method of claim 15, further comprising:
periodically obtaining, by the computing device, a data feed describing a plurality of item applications from a standardized source on another computing device via a network; and
associating, by the computing device, a corresponding item in catalog of items with the plurality of item applications.

23. The method of claim 15, further comprising:
periodically obtaining, by the computing device, a data feed describing a plurality of item applications from a standardized source on another computing device via a network;
determining, by the computing device, that a corresponding item that pertains to the plurality of item applications does not exist in the catalog of items;
creating, by the computing device, the corresponding item in the catalog of items; and
associating, by the computing device, the corresponding item in the catalog of items with the plurality of item applications.

24. The method of claim 15, wherein the non-application keyword pertains to a commonly defective item.

25. The method of claim 15, wherein the inferred keyword pertains to a commonly defective item.

\* \* \* \* \*